United States Patent [19]

Nakaoka et al.

[11] Patent Number: 4,652,149
[45] Date of Patent: Mar. 24, 1987

[54] DYNAMIC PRESSURE FLUID BEARING

[75] Inventors: Masaki Nakaoka, Yokohama; Teruo Komatsu, Tokyo; Shinji Goto, Tokyo; Tsuyoshi Matsunaga, Tokyo, all of Japan

[73] Assignee: Canon Kabushiki Kaisha, Tokyo, Japan

[21] Appl. No.: 882,459

[22] Filed: Jul. 8, 1986

Related U.S. Application Data

[63] Continuation of Ser. No. 620,674, Jun. 14, 1984, abandoned.

[30] Foreign Application Priority Data

Jun. 24, 1983 [JP] Japan .................. 58-114819

[51] Int. Cl.$^4$ .................. F16C 17/10; G08B 21/00
[52] U.S. Cl. .................. 384/100; 384/107; 384/448; 384/627; 340/682
[58] Field of Search .................. 384/99, 100, 107, 112, 384/113, 114, 115, 121, 123, 129, 371, 372, 448, 624, 627; 252/12; 340/682; 324/522–527

[56] References Cited

U.S. PATENT DOCUMENTS

| 3,173,299 | 3/1965 | Peterson | 384/647 X |
| 3,437,592 | 4/1969 | Boes et al. | 252/12 X |
| 3,730,893 | 5/1973 | Bilow et al. | 252/12 X |
| 3,879,301 | 4/1975 | Cairns | 252/12 |
| 4,320,431 | 3/1982 | Bell | 308/1 A X |
| 4,376,710 | 3/1983 | Gardos et al. | 252/12 X |
| 4,434,448 | 2/1984 | Bell et al. | 308/1 A X |

FOREIGN PATENT DOCUMENTS 5518  1/1983  Japan .................. 384/107

Primary Examiner—Stuart S. Levy
Assistant Examiner—David Werner
Attorney, Agent, or Firm—Fitzpatrick, Cella, Harper & Scinto

[57] ABSTRACT

A dynamic pressure fluid bearing, and particularly a dynamic pressure fluid bearing for effectively ensuring a minute gap between the shaft of the dynamic pressure fluid bearing and a bearing. More particularly, fluid intervenes between the shaft and the bearing and these two rotate relative to each other in a non-contact state, and a part or the whole of the bearing is formed of resin and the resin is endowed with electrical conductivity.

2 Claims, 4 Drawing Figures

DYNAMIC PRESSURE FLUID BEARING

This application is a continuation of application Ser. No. 620,674, filed June 14, 1984, now abandoned.

BACKGROUND OF THE INVENTION

1. Field of the Invention

This invention relates to a dynamic pressure fluid bearing, and particularly to a dynamic pressure fluid bearing for effectively ensuring a minute gap between the shaft of the dynamic pressure fluid bearing and a bearing.

2. Description of the Prior Art

In recent years, in high accuracy motors of which are required high speed, long life and low rotation irregularity, such as polygon mirror driving motors used in laser beam printers or the like, motors for VTR and motors for magnetic disk, dynamic pressure fluid bearings using gas such as air or liquid such as oil as the medium have been used because of their excellent bearing performance, low torque and low rotation irregularity during high-speed rotation. Such dynamic pressure fluid bearings are characterized by rotating in a non-contact state while keeping a minute gap (of the order of 2–10 $\mu$) between the fixed side and the rotatable side during the steady state, and the bearing performance thereof (rotation accuracy, irregularity, torque, etc.) originates in such a characteristic.

Ensuring such gap is very important in preventing troubles fatal to the bearings such as the seizure of the fixed side and the rotatable side and deterioration of grease or oil due to abrasive powder.

For this reason, during the assembly, close attention is paid so that fine powder may not enter into the gap and the bearing surface may not be damaged, and consideration is also given to the motor itself as by hermetically sealing clean air so that no problem may occur once the motor has been accurately assembled.

However, there is no effective means for confirming the state immediately after the assembly and therefore, heretofore, there has been adopted a method of slightly floating the rotatable portion in the thrust direction (for example, in the motor of FIG. 1 of the accompanying drawings, a sleeve 5 is slightly floated and the throttle hole 7 of a thrust pad 6 is closed) and manually rotating the rotatable portion and confirming the contact sound by ear, or a method of gradually increasing the number of revolutions of the motor and observing the occurrence of abnormal sound and vibration, but both of these methods have been governed by the sixth sense of the operator and have been poor in working property and unsuitable for mass production.

SUMMARY OF THE INVENTION

It is therefore an object of the present invention to provide a novel dynamic pressure fluid bearing improved in view of the above-noted disadvantages.

It is another object of the present invention to provide a dynamic pressure fluid bearing in which resin material used in the dynamic pressure bearing portion is endowed with electrical conductivity to thereby enable the conductivity of the fixed side and the rotatable side to be checked.

That is, the preferred construction of the present invention which can achieve the above objects comprises a dynamic pressure fluid bearing in which fluid intervenes between a shaft and a bearing and these two rotate relative to each other in a non-contact state, in which a part or the whole of the bearing is formed of resin and the resin is endowed with electrical conductivity.

According to a feature of the present invention, a conduction check by an oscillograph becomes possible for both the radial direction and the thrust direction, and the presence of metallic fine powder harmful to the size of the gap, the return contact by injury, etc., can be confirmed more quickly and reliably than when observed by ear.

Also, confirmation of harmful vibrations (whirl, air hammer, etc.) induced by the contact between the fixed side and the rotatable side during the steady rotation becomes possible.

Further, confirmation of float-up, particularly in the case of the rotatable sleeve type as shown in FIG. 1, leads to the check-up of the overall performance of the entire bearing because when the relation between the shaft and the inner surface of the sleeve is not good, there is naturally no float-up at a predetermined number of revolutions, and the float-up at the predetermined number of revolutions leads to the ensured number of times of starting and stoppage.

The mixing of carbon fiber with resin improves the wear proof of resin, and according to the experiment carried out by the present inventors, resin containing carbon therein withstands double or more number of times of starting and stoppage, as compared with resin containing no carbon therein.

The invention will become more fully apparent from the following detailed description thereof taken in conjunction with the accompanying drawings.

DESCRIPTION OF THE PREFERRED EMBODIMENTS

Figure 1:
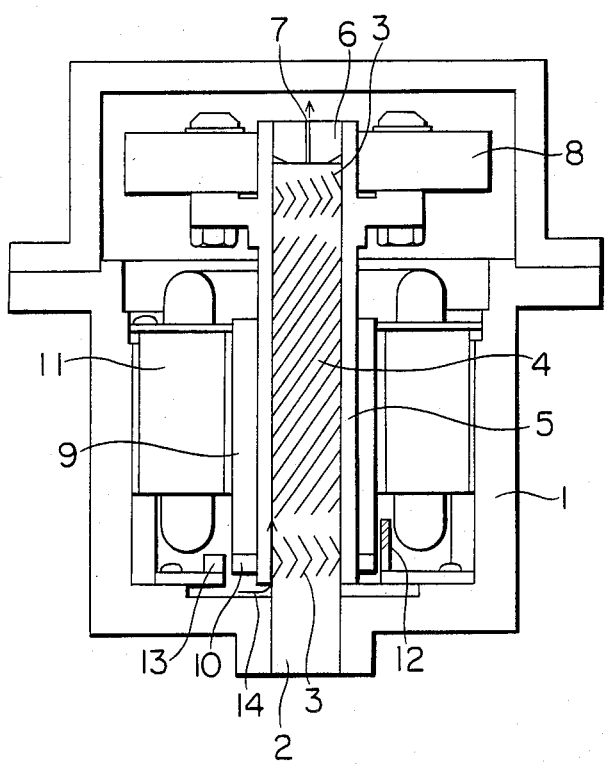
FIG. 1 is a cross-sectional view showing an embodiment of the present invention.

Specific embodiments of the present invention will hereinafter be described in detail. FIG. 1 shows the construction of a sleeve rotation type polygon driving circumferentially opposed motor using a dynamic pressure bearing with air as a medium. A shaft 2 fixed to an outer cylinder 1 is formed with herringbone-like grooves 3 and spiral groove 4, and this shaft 2 is covered with a sleeve 5 which is rotated so that the radial gap is of the order of 3–10 $\mu$.

A thrust pad 6 which contacts the end of the shaft during the stoppage of the motor is forced into the upper end of the sleeve 5, and a throttle hole 7 for generating a pressure in the thrust direction due to the throttle effect and causing the rotatable portion of the bearing to float up to a predetermined level is formed centrally 5 of the thrust pad 6.

Also, a polygon 8, a magnet 9 as a rotor and a balance ring 10 for keeping the balance of the rotatable member are mounted on the sleeve 5, and a stator coil 11, a Hall element 12 and a reflection type sensor 13 for reading the black and white pattern of the balance ring and obtaining a tack signal for PLL control (phase synchronizing control) are mounted on the outer cylinder in opposed relationship with the magnet 9, and these together constitute a PLL control DC Hall motor.

When a current flows to the stator coil, the sleeve 5 is rotated and the air flows in by said grooves as indicated by arrow 14, so that pressure in the radial and thrust directions is generated by the air film moving past the herringbone-like and spiral grooves 3 and 4 and the upper throttle hole 7, and shaft 2 and the sleeve 5 are rotated without contacting each other and continue to rotate while being controlled to a predetermined number of revolutions by PLL control.

An important element as the dynamic pressure bearing in such a vertical type construction is the thrust pad 6

The grooves in the outer periphery of the shaft and the inner surface of the sleeve are a radial bearing portion having rigidity in the radial direction, whereas the thrust pad 6 acts as a thrust bearing portion having thrust rigidity by the gas pumping action provided by the throttle hole 7 and the spiral grooves 4.

During rotation at a low speed, the pressure is low and therefore the thrust pad rotates while contacting the end portion of the shaft and thus, it is an important part which determines the life of the bearing. Therefore, in order to reduce its contact resistance, the cross-section of the thrust pad is of a spherical shape having a great curvature and the material thereof is a self-lubricating resin such as polyacetal, polyethylene, Nylon or Tetoron because contact between metals may cause biting, seizure and increased torque. As a result, if the thrust load is of the order of 500 g, the amount of torque change wear thereof is kept at a level causing practically no problem even if the motor is started and stopped several tens of thousands of times.

The thrust pad 6 is formed of a self-lubricating resin such as polyacetal, Nylon, Tetoron or polyphenylene sulfide resin containing 25% or more by weight of carbon fiber and as a result, it has a volume resistivity of $10^7$ or less and has electrical conductivity. Also, generally, the shaft 2 and the sleeve 5 are made of SUS or S material, and are subjected to Cr plating (chemical nickel plating impregnated with resin) with the sliding property thereof taken into account. Therefore, the conduction check by an oscillograph becomes possible for both the radial direction and the thrust direction, and the presence of metallic fine powder harmful to the size of the gap, warping due to damage, etc., can be checked for more quickly and reliably than when observed by ear.

Carbon fiber alone has been described above as a material for endowing the thrust pad with electrical conductivity, but the gist of the present invention resides in endowing resin with electrical conductivity and thus, mixing metal powder, an electrically conductive organic pigment or the like with resin would also come to mind.

The construction of the motor is not limited to that of FIG. 1, but the motor may also be of a construction having a tilting pad or foil type dynamic pressure bearing instead of the dynamic pressure bearing having grooves, or may also be of a hybrid type construction with a magnetic bearing, and the resin portion used in the dynamic pressure bearing portion thereof can be made electrically conductive and confirmation of non-contact can be effected.

Figure 2:
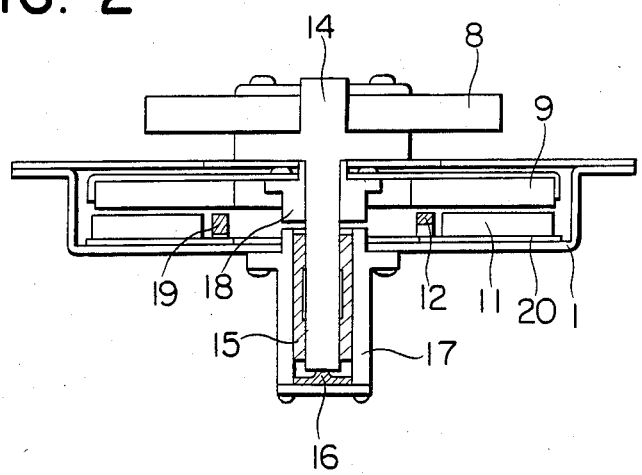
FIG. 2 is a cross-sectional view showing another embodiment of the present invention.

Reference is now had to FIG. 2 to describe another embodiment. FIG. 2 shows a DC Hall motor similar to the motor of FIG. 1. It is a surface-opposed motor (a so-called flat motor), and the bearing thereof is a shaft-rotation type dynamic pressure bearing with grease or oil as a medium. In FIG. 2, members functionally similar to those of FIG. 1 are given similar reference numerals and need not be described.

A polygon 8 and a holder 18 for supporting a magnet 9 are fixed to a shaft 14, and in opposed relationship with the magnet 9, a stator coil 11, two Hall elements 12 (only one of which is shown) and a Hall IC 19 for counting the number of revolutions from a variation in the magnetic poles of the magnet are provided on a print plate 20 which fixes the stator coil 11.

A liquid such as grease or oil of great viscosity intervenes in the bearing and therefore, due to the fact that the allowable value of the gap is great (the radial gap is of the order of 10 μ) and the fact that the grease or the like provides a lubricant also during a low speed, a bearing sleeve 15 of resin having herringbone grooves formed in the inner surface thereof is used while being forced into a bearing holder 17. A thrust plate 16 of resin having a spherical minute projection at the center thereof and having a spiral groove in the outer periphery thereof is fixed in opposed relationship with the end of the shaft. As a result, there is provided a dynamic pressure bearing which is not suitable for high speeds because of the use of grease or oil but is very inexpensive for medium speeds up to 10,000 r.p.m.

The bearing sleeve 15 and the thrust plate 16 are formed of a self-lubricating resin such as polyacetal, Nylon, Tetoron or polyphenylene sulfide resin containing 25% or more by weight of carbon fiber and as a result, they have volume resistivity of $10^7$ or less and have electrical conductivity. Also, generally, the shaft 14 is made of SUS or S material, and is subjected to Cr plating (chemical nickel plating impregnated with resin) with the sliding property thereof taken into accounting and therefore, the conduction check by an oscillograph becomes possible for both the radial direction and the thrust direction.

According to the present invention, as described above, the bearing performance can be simply checked by electrical conductivity.

Figure 3:
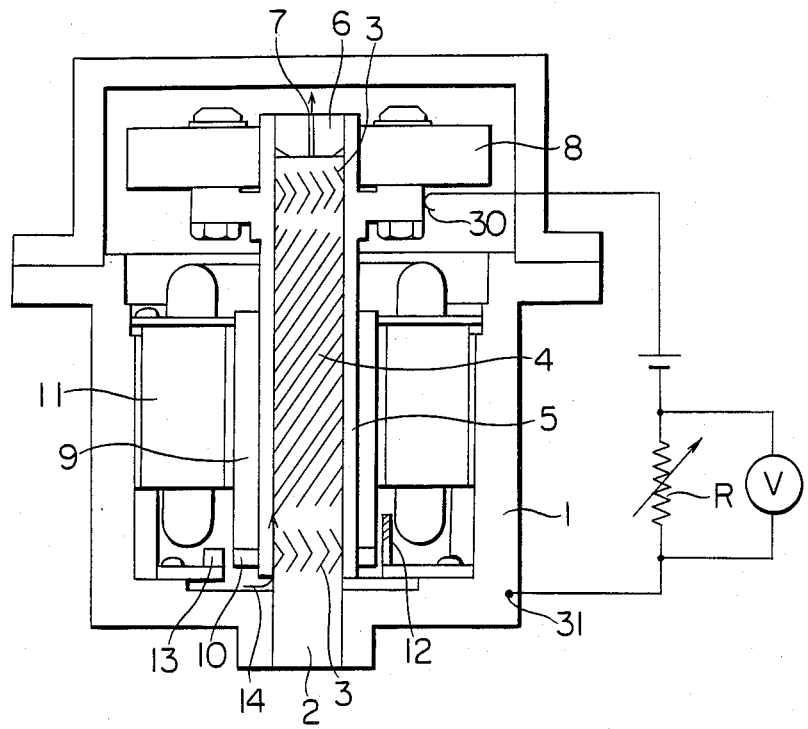
FIG. 3 is a cross-sectional view showing the state in which the assembled condition is confirmed.

FIG. 3 is a cross-sectional view showing the state in which the assembled condition is confirmed. A contactor 30 is brought into contact with the outer periphery of the sleeve 5, a terminal 31 is attached to the shaft 2 and the sleeve 5 is rotated.

Figure 4:
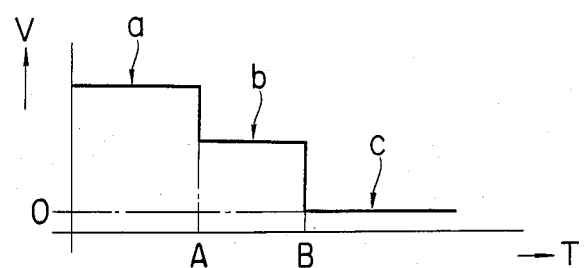
FIG. 4 is a voltage-time graph showing the state of the oscillograph of FIG. 3.

FIG. 4 shows the variation in voltage when the sleeve 5 is rotated. At first, the shaft 4 is in contact with the sleeve 5 and the shaft 4 is in contact with the thrust pad 6 and therefore, the resistance is small and the voltage is at level a. Thereafter, when the speed of rotation of the sleeve 5 is enhanced, the shaft 4 and the sleeve 5 become separate from each other and float up in the radial direction. Accordingly, only the shaft 2 and the thrust pad 6 contact each other and therefore, the resistance becomes greater and the voltage drops to level b. Further, when the sleeve 5 is rotated at a high speed, the shaft 4 and the thrust pad 6 become separate from each other and float up relative to each other in the thrust direction. Accordingly, the shaft 2 comes out of contact with the thrust pad 6 and the sleeve 5 and therefore, the resistance becomes still greater and the voltage drops to level c (substantially zero).

Accordingly, if one observes this state by means of an oscillograph, one can know the time of float-up in the radial direction and the time of float-up in the thrust direction. Also, where metal powder or the like intervenes between the shaft 2 and the sleeve 5, the voltage drop from the level a to the level b does not clearly appear and therefore, the abnormality can be detected. The other abnormality (previously described) can likewise be found out.

If the resistance of a variable resistor R is changed, it will be possible to cope with the resistance value of the thrust pad 6.

What we claim is:

1. A method for checking a dynamic pressure fluid bearing which comprises a support member and a rotary member rotating with fluid intervening between the support member and the rotary member so as to enable the rotary member to float in the thrust and the radial directions relative to the support member, said method comprising the steps of:
   providing such a bearing, with the support member and the rotary member so arranged relative to each other as to permit distinguish the thrust-direction electrical resistance value from the radial-direction electrical resistance value, said values being those occurring when the support member and the rotary member contact each other in the thrust direction and the radial direction, respectively; and
   electrically checking the floating conditions of the rotary member relative to the support member in the thrust and the radial directions by checking the electrical conduction therebetween in the thrust and the radial directions respectively.

2. A dynamic pressure fluid bearing comprising a support member, a rotating rotary member with fluid intervening between said support member and said rotary member, so as to cause said rotary member to float in the thrust and the radial directions relative to said support member, and a thrust receiving member receiving thrust loads of said rotary member while said rotary member is stationary or rotating at a low speed;
   said rotary member and said support member being electrically conductive, and said thrust receiving member being made of a conductive resin;
   said rotary member, said support member and said thrust receiving member being arranged such that a radial-direction electrical resistance value, when said rotary member and said support member are in contact with each other, is different from a thrust-direction electrical resistance value when said rotary member is not in contact with said support member, and such that said thrust receiving member receives said thrust loads; and
   means for electrically checking the floating conditions of said rotary member relative to said support member in the thrust and the radial directions by checking the electrical conduction between said rotary member and said support member.

* * * * *